3,273,839
FASTENING DEVICES
Alan James Bennett, Pontypridd, Glamorgan, Wales, assignor to Tinnerman Products, Inc., Cleveland, Ohio, a corporation of Ohio
Filed July 30, 1964, Ser. No. 386,243
2 Claims. (Cl. 248—73)

This invention relates to fastening devices, and in particular to a fastening device for securing a cable or pipe to a panel by engagement of the fastening device in apertures formed in the panel on opposite sides of the position to be occupied by the cable or pipe.

The present invention, according to one aspect provides a fastening device comprising a strap having a pin projecting therefrom in a direction substantially normal to the adjacent surface of the strap, the pin being straight-sided and made of a resilient material which permits the pin to be driven into an aperture in a panel whose area is slightly less than the normal cross-sectional area of the pin, the pin forming a neck at the position thereon which lies within the aperture, which neck travels along the pin as the pin is driven through the aperture.

The present invention, according to another aspect, provides a fastening device comprising a strap having a pin projecting therefrom in a direction substantially normal to the adjacent surface of the strap, the pin being of circular cross-section with an outer diameter which is constant over substantially its entire length, and being made of a material whose resilience permits the pin to be driven into an aperture whose diameter is less than the said diameter of the pin and be retained by friction in the aperture at any chosen position along its length.

Some embodiments of the invention will now be particularly described with reference to the accompanying drawings, in which.

Figure 1:
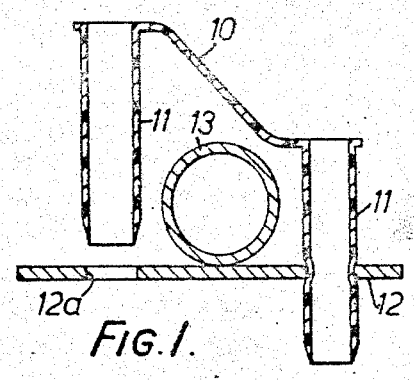
FIG. 1 is a section on a vertical plane through one form of fastening device according to the invention, showing the pins thereof being inserted in succession into holes in a panel to hold a pipe thereon.

The form of fastening device shown in FIG. 1 comprises a flexible strap 10 having two pins 11 integral therewith and extending from the same side of the strap in spaced relationship, each pin being perpendicular to the adjacent portion of the strap.

The pins are formed of a resilient material and are straight-sided along their entire length, except for the tip which is preferably tapered to facilitate insertion of the pin in an aperture 12a of a panel 12, each pin being slightly oversize in relation to the aperture. In particular, each pin is of circular cross-section and has an external diameter which is constant along its length, except at the tapered tip, this constant diameter being slightly greater than the diameter of the hole in the panel into which the pin is to be inserted.

Figure 2:
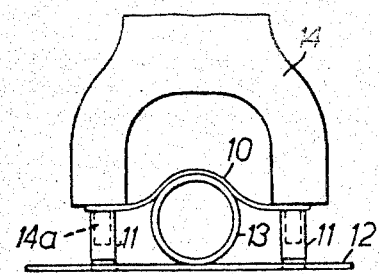
FIG. 2 is a side elevation of the fastening device of FIG. 1 showing the pins about to be inserted simultaneously into holes in a panel by means of a fixing tool.
Figure 3:
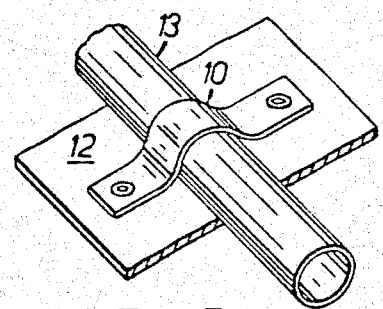
FIG. 3 is a perspective view of the fastening device after completion of the fixing operation.

To secure a pipe 13 to the panel, it is held against the panel between the apertures therein and the two pins of the fastening device are inserted into the apertures so that the pins and the strap form a bridge over the pipe. The pins are then driven home into the apertures simultaneously (as shown in FIG. 2) or in succession (as shown in FIG. 1) until the strap lies tightly across the pipe. It is not necessary for the full length of each pin to be driven into its associated aperture. As each pin is driven into its aperture, the longitudinal cross-section of the pin will be seen in FIG. 1 to have a necked portion in register with the aperture and a correspondingly enlarged portion disposed to either side thereof, this neck travelling along the pin as the latter is driven in. The cross-sectional area of such enlarged portion is not less than, and is normally greater than, the original cross-sectional area of the pin at that point. Thus the force necessary to withdraw the pins from the apertures is at least as great as the force required to drive them into the apertures.

It has been found that when the pins are made of certain materials, the distorted portion of the pin in and adjacent the aperture, after a certain time, adopts a permanent set which greatly increases the force necessary to withdraw the pin. Tubular pins made of polyethylene, polyvinylchloride or nylon have displayed this property. These tubular pins can be open or closed at their free ends. In suitable materials, the pins can alternatively be solid.

Figure 4:
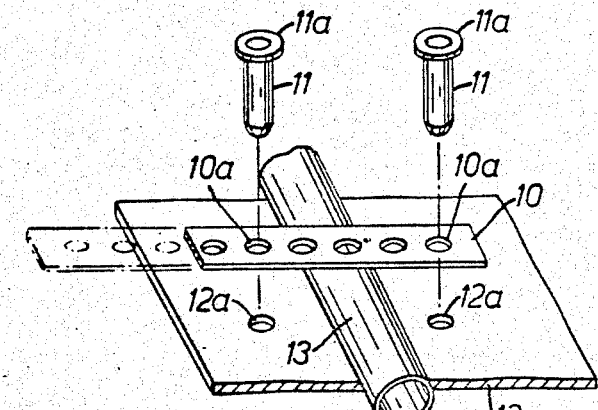
FIG. 4 is a perspective view of a modified form of fastening device.

The pins and the strap of the fastening device can be made in one piece as shown in FIG. 1, or alternatively one of the pins, or as shown in FIG. 4 both of the pins, can be formed with a head 11a and received in a hole 10a in the strap. If desired and as shown, the strap can be formed with a plurality of holes to enable the spacing between the pins to be varied to accommodate cables or pipes of differing diameters.

Figure 6:
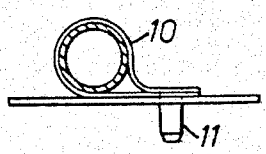
FIG. 6 is a side elevation of a further modified form of fastening device.

In a modification of the above described embodiment and as shown in FIG. 6, only one pin is used, this pin being at one end of the strap whilst one or more holes are formed in the other end of the strap so that by wrapping the strap around the pipe and passing the pin through the opening in the opposite end of the strap to form a loop, the pipe can be secured to a panel by insertion of the single pin into a single aperture in the panel.

Figure 5:
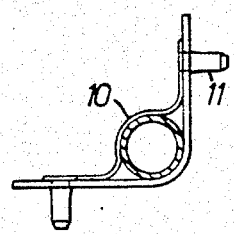
FIG. 5 is a section through an L section panel showing the fastening device of FIGS. 1 and 2 holding a pipe in the corner of the panel.

The panel to which the pipe is secured by the fastening device can be either flat or, for example L section. In the latter case as shown in FIG. 5, the pipe can be secured in the corner of the L section panel by providing one aperture in each arm of the panel for reception of one of the pins of the fastening device.

In the case of a fastening device having two pins, the formation of each pin, at its end adjacent the strap, with a recess or, in the case of a tubular pin, with an opening, permits fixing of the fastening device by means of the tool shown in FIG. 2. This tool 14 comprises a fork having two prongs each of which is inwardly stepped at its free end to define a stud 14a for engagement in the recessed or open end of the pin.

In order to oppose longitudinal movement of the pipe beneath the strap, the strap in each of the embodiments described above may be formed with longitudinal ridges on its surface in engagement with the cable.

I claim:
1. A fastening device for mounting an article on a support member having a pair of spaced, substantially circular apertures therein comprising, a flexible strap adapted to be brought into overlying engagement with said article, an elongated, hollow pin integrally attached to each of the opposed ends of said strap and extending normally therefrom adapted to be inserted through the apertures in said support member, said pins being of a substantially identical construction and comprised of a resilient polymeric material, each of said pins having a substantially uniform wall thickness throughout a major por- tion of its axial length with a substantially smooth, uninterrupted outer surface throughout such length prior to insertion through the respective of said apertures, each of said pins having a smooth, uninterrupted inner surface which is free of any internal support means, each of said pins being circular in transverse section with the diameter being constant throughout its axial extent and having a dimension which is designed to be greater than the corresponding transverse dimension of the respective of said apertures, the resiliency of the polymeric material of said pins being such that when inserted through said apertures, the wall of each of said pins is circumferentially deformed inwardly to provide a reduced diameter neck portion and enlarged portions on either side thereof adapted to travel progressively upwardly along the axial extent of each of said pins as they are moved downwardly through the respective apertures; and the material of each of said pins passed which the neck portion and enlarged portions have traveled being adapted to resiliently return to the original constant diameter of said pins prior to insertion through said apertures, whereby the confronting marginal edges of said apertures are held in frictional engagement within the neck portion and between the enlarged portions of the respective pins in any selective axial position thereof, thereby to retain the strap in frictional engagement around said article for holding the same against said support member.

2. A fastening device in accordance with claim 1, wherein the pins are made from a resilient polymeric material selected from the group consisting of polyethylene, polyvinylchloride and nylon.

References Cited by the Examiner

UNITED STATES PATENTS

| | | | |
|---|---|---|---|
| 2,209,403 | 7/1940 | Kittner et al. | 18—59 |
| 2,488,001 | 11/1949 | Birk | 29—275 |
| 2,839,823 | 6/1958 | Brancato | 29—275 |
| 2,896,889 | 7/1959 | Hershberger et al. | 248—71 |
| 2,937,834 | 5/1960 | Orenick et al. | 248—71 |
| 2,948,937 | 8/1960 | Rapata | 248—68 |
| 2,995,328 | 8/1961 | Whitted | 248—71 |
| 3,009,220 | 11/1961 | Fein | 24—16 |
| 3,118,644 | 1/1964 | Wernig | 248—73 |
| 3,169,439 | 2/1965 | Rapata | 85—5 |

FOREIGN PATENTS

| | | |
|---|---|---|
| 637,342 | 1/1928 | France. |
| 93,771 | 12/1938 | Sweden. |
| 873,304 | 7/1961 | Great Britain. |
| 884,124 | 12/1961 | Great Britain. |
| 921,029 | 3/1963 | Great Britain. |

CLAUDE A. LE ROY, *Primary Examiner.*